United States Patent [19]

Brock

[11] Patent Number: 4,928,188

[45] Date of Patent: May 22, 1990

[54] MAGNETORESISTIVE ELEMENT SANDWICHED BETWEEN A SAL FERRITE SUBSTRATE AND A COVER CONTAINING AN EASY AXIS BIASING MAGNET

[75] Inventor: George W. Brock, La Jolla, Calif.

[73] Assignee: Eastman Kodak Company, Rochester, N.Y.

[21] Appl. No.: 214,994

[22] Filed: Jul. 5, 1988

[51] Int. Cl.⁵ .......................... G11B 5/30; G11B 5/223
[52] U.S. Cl. ...................................... 360/113; 360/125
[58] Field of Search .............. 360/113, 125; 338/32 R

[56] References Cited

U.S. PATENT DOCUMENTS

| | | | |
|---|---|---|---|
| 4,354,212 | 10/1982 | Nouchi et al. | 360/113 |
| 4,816,948 | 3/1989 | Kamo et al. | 360/113 |
| 4,833,560 | 5/1989 | Doyle | 360/113 |

Primary Examiner—John H. Wolff
Attorney, Agent, or Firm—Daniel Robbins

[57] ABSTRACT

A magnetoresistive head is fabricated on a ferrite substrate which is both the mechanical support for the head assembly and a soft adjacent layer for biasing the magnetoresistive element of the head. Easy axis bias is supplied by a fixed magnet located in the head coverplate, and the substrate opposite the magnet is recessed and filled with a non-magnetic material to prevent distortion of the fixed magnet field by the ferrite substance.

8 Claims, 4 Drawing Sheets

MAGNETORESISTIVE ELEMENT SANDWICHED BETWEEN A SAL FERRITE SUBSTRATE AND A COVER CONTAINING AN EASY AXIS BIASING MAGNET

BACKGROUND OF THE INVENTION

1. Field of the Invention

This invention relates to a magnetoresistive reproduce head, and in particular to a head of simplified structure and improved operating characteristics.

2. Description Relative to the Prior Art

The magnetoresistive (MR) reproduce head is well known in the art; its high signal output and ease of manufacture by means of batch fabrication techniques have made it an attractive candidate for use in modern digital data devices. The unshielded MR head, disclosed in U.S. Pat. No. 3,493,694 issued in the name of R. P. Hunt, has been improved and elaborated upon, and U.S. Pat. Nos. 3,840,898, 3,864,751, and 3,940,797 reflect such improvements and elaborations. Included among the improvements are a variety of hard axis biasing techniques for linearizing the signal response of the MR element whose inherent resistance change as a function of magnetic field is quadratic in nature.

The function of the hard axis biasing of the MR element may be understood by referring to FIG. 1. The ordinate of the curve 10 depicts the percent change of resistance of the MR element as a function of the applied magnetic field H plotted along the abscissa. It will be observed that the shape of the curve 10 is substantially non-linear over the major portion of its range. For the d.c. hard axis biasing case, which is the conventional hard axis biasing method for an MR element, the bias point 12 is selected in the most nearly linear portion of the curve 10, and this is essentially at the point of inflection 14 of the curve 10. The value of the field H is then established at the value Hb to set the hard axis bias at the point of inflection 14, and the signal to be reproduced, Hs, varies the magnetic field about the bias value Hb with a resulting detectable change in the MR element's resistance 18.

The principle of biasing by means of a soft adjacent layer (SAL) may be understood by referring to FIG. 2. A magnetoresistive layer 20 is adjacent to, and insulated from, an SAL biasing layer 22. The MR layer may be 400 angstroms thick, the SAL layer 300 angstroms thick, each layer being 5 microns high and approximately as wide as the magnetic track width. The distance between the MR and SAL layers may be on the order of 1000-3000 angstroms. In the art, the MR and SAL elements have generally been fabricated from the same or similar materials. For example, the MR element may be made of a Ni-Fe alloy, e.g. permalloy, while an SAL layer may be fabricated from Ni-Fe alloy or other alloys such as CoZr alloys. In the conventional operation of the MR head, a d.c. sense current 24, which serves a dual purpose, flows in the MR element 20. The resistance of the MR element 20 is modulated by the signal field of the medium, and the current 24 flowing through the modulated magnetoresistance provides a baseband signal voltage which is the head output. Because of the presence of the SAL 22, the current 24 is also the origin of the hard axis bias field at the MR element 20. A magnetic field Hi due to the current 24 in the MR element 20 magnetizes the SAL 22 which, in turn, generates the hard axis bias field Hb which rotates the MR element's magnetization vector 26, establishing the hard axis bias point of the MR element 20. The prior art teaches operation of the SAL in a magnetically saturated state to keep the hard axis bias field magnitude, Hb, independent of any variations in Hi resulting from variations in the sense current 24.

Referring to FIG. 3, an MR head of the prior art is deposited on a substrate 30, which is a wear resistant, non-magnetic substance such as a silicon or AC2, i.e. ($Al_2O_3$+TiC), wafer. An insulating layer 32, such as $SiO_2$ is then laid down, followed by a deposited SAL element, 34. Another insulating layer 36 is then deposited to a thickness of from 1000-3000 angstroms followed by the deposition of the MR element 38. The final deposition step lays down another insulating layer 40, and then a cover plate of wear resistant material 42 is secured to the head structure completing the assembly. The direction of tape travel is indicated by an arrow 44, and the head is contoured by a lapping process to provide a contour 46 whereby the tape is in intimate contact with the head contour 46 during operation. Recalling that the separation between the SAL element 34 and the MR element 38 is only on the order of 1000-3000 angstroms, and that the lapping process selectively abrades the surface of the head to provide the contour 46, a problem in the prior art has been the "smearing" of the mechanically soft SAL and MR elements during lapping with resultant electrical "shorts" between these elements. The present invention circumvents this problem by means of a hard axis biasing technique that eliminates the need for a mechanically soft deposited SAL element located in proximity to the MR element within the narrow gap of the head.

DETAILED DESCRIPTION

SUMMARY OF THE INVENTION

Rather than fabricating an MR head on a non-magnetic substrate and then using an auxiliary SAL deposited hard axis biasing film, the present invention teaches fabricating the head on a magnetically soft, but mechanically wear resistant substrate, and utilizing the magnetic properties of the magnetic substrate to provide the hard axis biasing of the MR element. A suitable material for the substrate is a magnetic ferrite. As noted earlier, the teaching of the prior art is for a saturated SAL, and it will be appreciated that a magnetic ferrite wafer substrate having a substantial bulk will not be saturated by the relatively small sense current flowing in the MR element. The present invention teaches the use of an unsaturated hard axis biasing structure in the form of the magnetically soft but mechanically refractory substrate. Co-pending U.S application No. 191,086 in the name of Neil Smith and assigned to the same assignee as the present application, teaches the use of an unsaturated thin film SAL as a hard axis biasing element. In application No. 191,086, it is disclosed that short wavelength operation of an MR head is enhanced by use of the non-saturated SAL hard axis biasing technique. The advantages accruing from such an unsaturated hard axis bias condition are also present in the present invention, albeit that the unsaturated SAL is now the substrate upon which the head is fabricated rather than a deposited thin film. U.S. Pat. No. 4,816,948 in the names of Kamo et al, discloses the use of an unsaturated SAL for hard axis biasing.

The structure of the head readily admits provision for simultaneous easy axis biasing, known in the art as advantageous in minimizing the effect of detrimental domain structures in the MR element. A fixed magnet is located in the head coverplate, and the MR element is provided with extended legs for magnetically coupling the easy axis bias field from the fixed magnet to the signal field sensing portion of the MR element. Because of the proximity of the mass of the low reluctance magnetic ferrite substrate to the fixed magnet of the coverplate, with the attendant risk of magnetically "short circuiting" the field of the fixed magnet, the portion of the ferrite substrate opposite the magnet is recessed and filled with a solid non-magnetic material such as glass.

DESCRIPTION OF THE INVENTION

Figure 1:
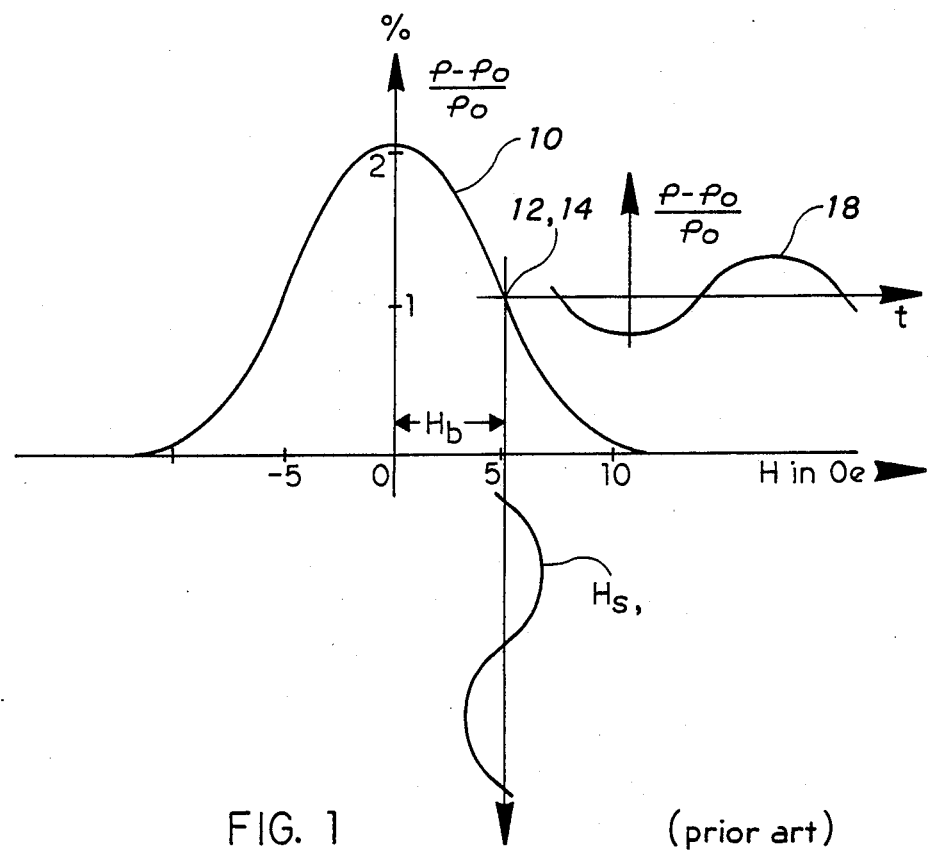
FIG. 1 shows hard axis biasing of the prior art device.
Figure 3:
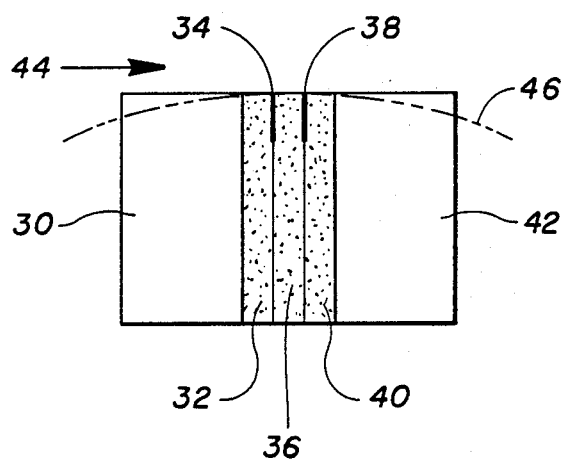
FIG. 3 depicts a prior art M.R head.
Figure 2:
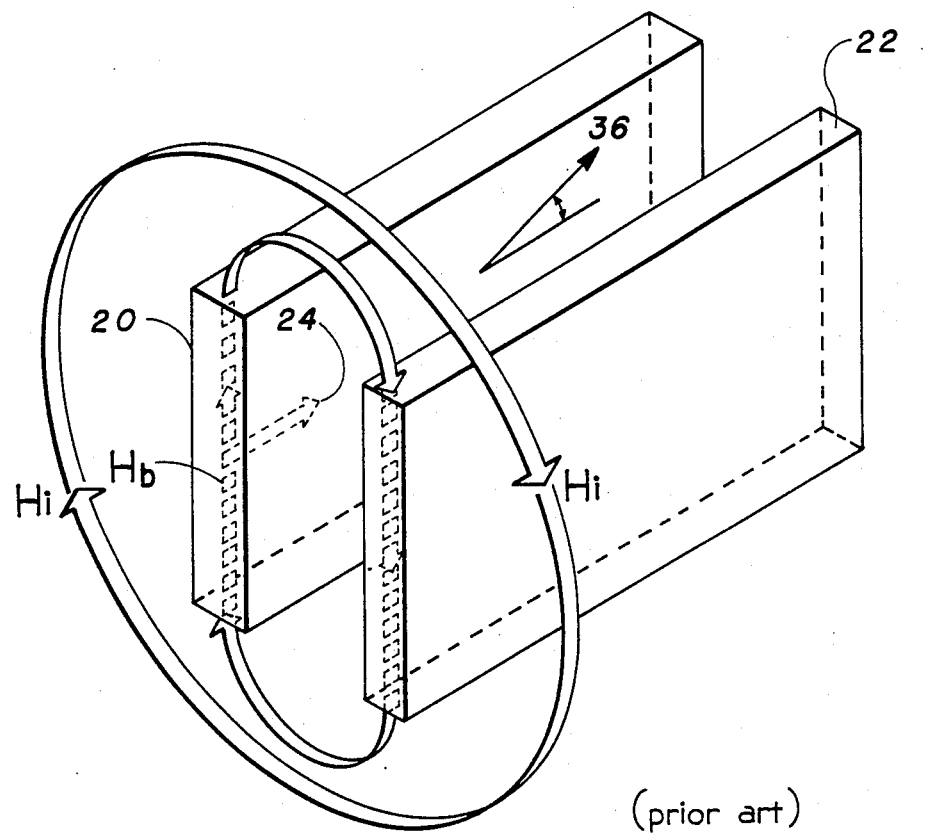
FIG. 2 shows conventional biasing by means of a soft layer.
Figure 4:
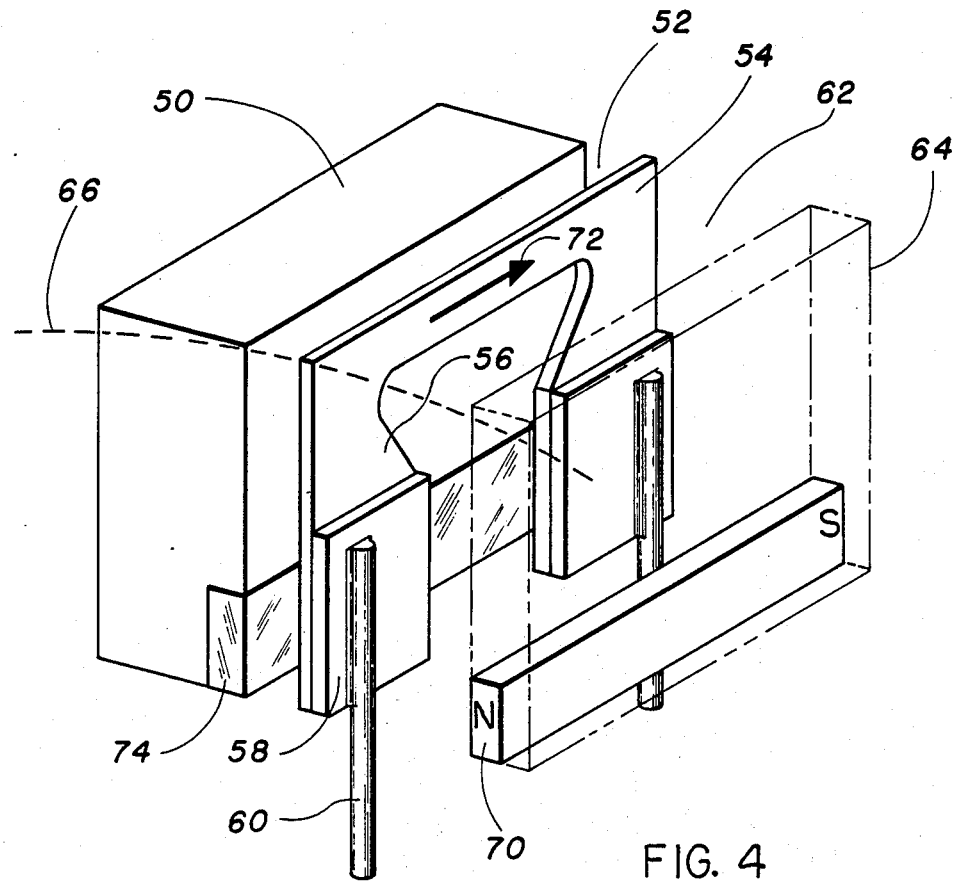
FIG. 4 shows steps for fabricating the improved M.R. head.

Referring to FIG. 4, a wafer of ferrite 50 serves as a substrate upon which the magnetoresistive head is fabricated. An insulating layer 52, typically, but no restricted to, $Al_2O_3$ or $SiO_2$ is deposited to a thickness of approximately 3000 angstroms setting the distance of the MR element from the ferrite wafer 50. Using methods known in the art, the surface of the deposited insulating layer 52 is masked with the outline of the MR element 54, and deposition of permalloy provides an essentially "U" shaped MR structure 54. Copper or gold pads, 58, are then deposited to serve as connection points for leads 60 which connect to the MR element 54. A ceramic layer $Al_2O_3$, 62 is deposited over the MR element 54, and this ceramic layer 62 also fills the region between the legs 56 of the MR element 54. The layer 62 is then lapped to provide a planar surface. A mating coverplate 64 of a ceramic such as barium titanium ceramic or calcium titanium ceramic is glued to the lapped surface using an epoxy adhesive. The entire structure is then contoured by lapping to conform to the desired tape path over the head.

In the preferred embodiment of the invention, an easy axis bias magnet 70 is incorporated into the coverplate 64. With the coverplate 64 mated to the head structure on wafer 50, the field of the magnet 70 is coupled through the legs 58 of the MR element 54 providing a longitudinal field along the easy axis 72 of the MR element. This field is instrumental in suppression of domains which give rise to Barkhausen noise in the MR element. The magnet 70 may either be a bar magnet mounted in the coverplate 64, or may be deposited of a material such as CoFe directly into the face of the coverplate. In order to prevent magnetic flux leakage of the field of the magnet 70 through the ferrite wafer 50, which would magnetically "short circuit" the flux path through the MR element 54, the ferrite wafer 50 is recessed in the region 74 facing the magnet 70. The recessed region 74 is filled with a non-magnetic material such as glass to eliminate the shorting problem with its resultant distortion of the magnetic field.

Figure 5:
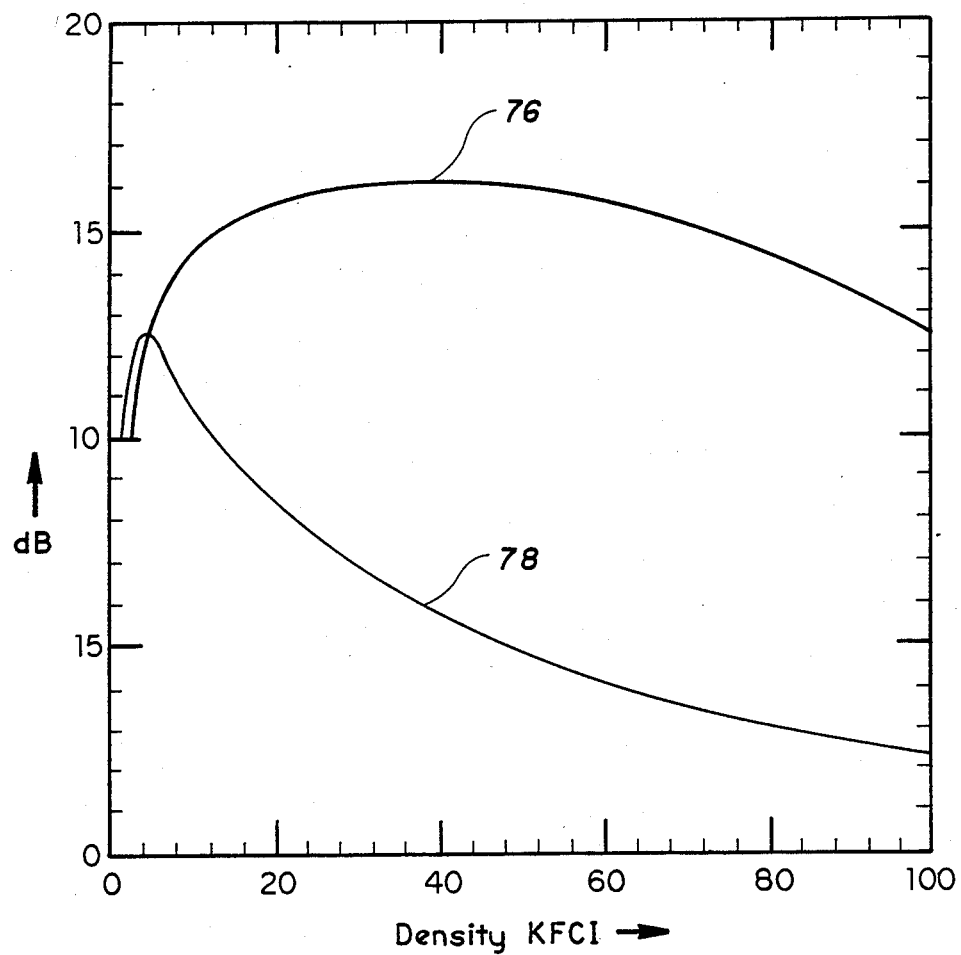
FIG. 5 shows improved head performance response.

The performance improvement at higher recorded flux densities attainable by use of the unsaturated SAL magnetic substrate may be seen in FIG. 5, where the response 76 of the MR head of FIG. 4 with an unsaturated ferrite substrate SAL is compared to the response 78 of an unshielded MR head biased by a saturated film SAL. The improved response of curve 76 at the higher flux densities is due to signal enhancement resulting from interaction between the recorded signal flux and the unsaturated SAL and MR elements as fully described in co-pending application No. 191,086.

Figure 6:
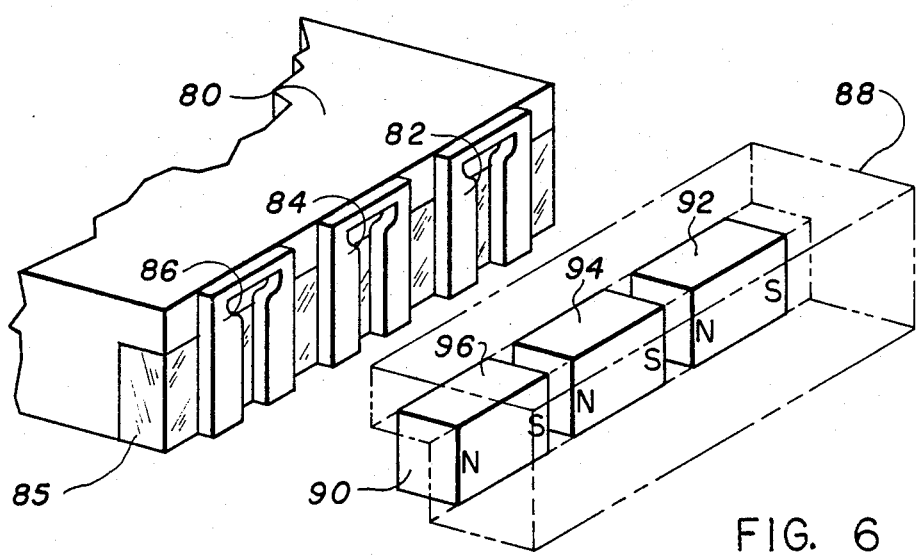
FIG. 6 is a view of a multi-track head.

In applying the teaching of the invention to multitrack head fabrication, FIG. 6 shows, for the example of a three track head, a magnetic unsaturated SAL ferrite substrate 80 on which is deposited the three track determining MR elements 82, 84, 86. A coverplate 88 with integral easy axis biasing magnets 92, 94, 96 completes the head structure. The magnets 92, 94, 96 may either be bar magnets or a deposited magnetic structure configured as shown; in either case the magnets 92, 94, 96 result in localized magnetic fields which couple with the legs of the MR elements 82, 84, 86 to provide easy axis bias for the MR elements, as previously described.

The invention has been described in detail with particular reference to preferred embodiments thereof, but it will be understood that variations and modifications can be effected within the spirit and scope of the invention.

What is claimed is:

1. A magnetoresistive head comprising:
   a. a substantially rigid substrate support having a substantially planar surface for deposition of said magnetoresistive head thereon, said substrate further comprising a magnetic material adapted for operation as an unsaturated soft adjacent layer,
   b. a first insulating layer deposited on said planar surface of said substrate,
   c. a magnetoresistive film deposited on said first insulating layer, said magnetoresistive film having an easy axis therein, said film further adapted for the flow of current therethrough along the direction of said easy axis, whereby said flow of current induces a first magnetic field in said unsaturated soft adjacent layer for hard axis biasing of said magnetoresistive film,
   d. a second insulating layer deposited on said magnetoresistive film,
   e. a non-magnetic coverplate adheredly covering said second insulating layer, said coverplate having a substantially planar coverplate surface,
   f. a magnet located in said coverplate surface, whereby said magnet generates a second magnetic field,
   g. said magnetoresistive film further comprising magnetic coupling means for coupling to said second magnetic field, whereby easy axis biasing of said magnetoresistive film is provided, and
   h. said substrate further having a recessed region opposite said magnet, said recessed region being filled with a non magnetic material whereby the field of said magnet is undistorted by said substrate.

2. The magnetoresistive head of claim 1 wherein said substrate is a ferrite material.

3. The magnetoresistive head of claim 2 wherein said magnetoresistive film is a permalloy film.

4. The magnetoresistive head of claim 2 wherein the thickness of said insulating layer is between 1000 and 3000 angstrom.

5. The magnetoresistive head of claim 2 wherein said magnet is a deposited thin film magnet.

6. An improved multitrack magnetoresistive head comprising:

a. a substantially rigid substrate support having a substantially planar surface for deposition of said magnetoresistive head thereon, said substrate further comprising a magnetic material adapted for operation as an unsaturated soft adjacent layer, b. a first insulating layer deposited on said planar surface of said substrate, c. a plurality of magnetoresistive films deposited on said first insulating layer, said magnetoresistive films each having easy axes therein, said films further adapted for the flows of currents therethrough along the directions of said easy axes, whereby said flows of currents induce a plurality of first magnetic fields in said unsaturated soft adjacent layer for hard axis biasing said magnetoresistive films, d. a second insulating layer deposited on said magnetoresistive films, e. a non-magnetic coverplate adheredly covering said second insulating layer, said coverplate having a substantially planar coverplate surface, f. a plurality of magnets located in said coverplate surface, said magnets being in one-to-one correspondence with said magnetoresistive films, said magnets generating a plurality of second magnetic fields, g. said magnetoresistive films further comprising a plurality of magnetic coupling means for coupling to said second magnetic fields, whereby easy axis biasing of said magnetoresistive films is provided, and h. said substrate has a recessed region opposite said magnets, said recessed region being filled with a non magnetic material whereby the fields of said magnets are undistorted by said substrate.

7. The magnetoresistive head of claim 6 wherein said substrate is a ferrite material.

8. The magnetoresistive head of claim 6 wherein said magnets are deposited thin film magnets.

* * * * *